United States Patent
Gravenites et al.

(10) Patent No.: US 10,929,202 B2
(45) Date of Patent: Feb. 23, 2021

(54) CLOUD SERVICE NOTIFICATIONS

(71) Applicant: Oracle International Corporation, Redwood Shores, CA (US)

(72) Inventors: Greg Gravenites, Littleton, CO (US); Levente Gergely, Budapest (HU); Zoltan Fleisz, Budapest (HU); Rajan Mahendrakumar Modi, Highlands Ranch, CO (US); Akash K C, Kerala (IN); Muthukumar Palanisamy, Tamil Nadu (IN)

(73) Assignee: Oracle International Corporation, Redwood Shores (CA)

( * ) Notice: Subject to any disclaimer, the term of this patent is extended or adjusted under 35 U.S.C. 154(b) by 464 days.

(21) Appl. No.: 15/705,963

(22) Filed: Sep. 15, 2017

(65) Prior Publication Data

US 2018/0083851 A1 Mar. 22, 2018

Related U.S. Application Data

(60) Provisional application No. 62/510,979, filed on May 25, 2017.

(30) Foreign Application Priority Data

Sep. 16, 2016 (IN) .............................. 201641031590

(51) Int. Cl.
*H04L 12/26* (2006.01)
*G06F 9/54* (2006.01)
(Continued)

(52) U.S. Cl.
CPC .............. *G06F 9/54* (2013.01); *G06F 9/5077* (2013.01); *G06F 16/2358* (2019.01);
(Continued)

(58) Field of Classification Search
CPC ........ G06F 9/54; G06F 16/25; G06F 16/2358; G06F 9/5077; H04L 41/0869;
(Continued)

(56) References Cited

U.S. PATENT DOCUMENTS 6,631,363 B1 * 10/2003 Brown .................... G06F 9/542
370/401
9,235,971 B1 * 1/2016 Juels .................... G05B 23/027
(Continued)

OTHER PUBLICATIONS

RoboMQ.io https://www.robomq.io/docs/docs.html.
(Continued)

*Primary Examiner* — Philip J Chea
*Assistant Examiner* — Wuji Chen
(74) *Attorney, Agent, or Firm* — Kilpatrick Townsend & Stockton LLP

(57) ABSTRACT

Techniques are disclosed for providing notifications to a user. A user can configure the types of notifications they would like to receive. The notifications are generated according to messages that are generated in response to changes to activities in an integration flow. Types of notifications can include error notifications, system notifications and status notifications. The notification can be provided to the user via an electronic communication.

20 Claims, 15 Drawing Sheets

(51) Int. Cl.
  *G06F 9/50* (2006.01)
  *G06F 16/23* (2019.01)
  *H04L 12/24* (2006.01)
  *G06F 16/25* (2019.01)
  *H04L 29/08* (2006.01)

(52) U.S. Cl.
  CPC .......... *G06F 16/25* (2019.01); *H04L 41/0856* (2013.01); *H04L 41/0869* (2013.01); *H04L 41/50* (2013.01); *H04L 43/08* (2013.01); *H04L 67/26* (2013.01); *H04L 41/0816* (2013.01); *H04L 67/10* (2013.01)

(58) Field of Classification Search
  CPC ..... H04L 41/0856; H04L 41/50; H04L 67/26; H04L 43/08; H04L 67/10; H04L 41/0816
  See application file for complete search history.

(56) References Cited

U.S. PATENT DOCUMENTS

| | | | |
|---|---|---|---|
| 9,391,855 B2 | 7/2016 | Mouline et al. | |
| 2003/0063723 A1* | 4/2003 | Booth | H02J 13/00028 379/106.03 |
| 2004/0002958 A1* | 1/2004 | Seshadri | H04L 51/24 |
| 2004/0225718 A1* | 11/2004 | Heinzel | G06Q 10/107 709/206 |
| 2006/0150105 A1* | 7/2006 | Bright | G06F 11/0751 715/736 |
| 2006/0282533 A1* | 12/2006 | Steelberg | G06Q 30/0269 709/224 |
| 2007/0083866 A1* | 4/2007 | Mani | G06F 9/542 718/102 |
| 2008/0215665 A1* | 9/2008 | Appleby | H04L 67/04 709/202 |
| 2009/0204666 A1* | 8/2009 | Sana | H04L 67/26 709/203 |
| 2011/0022812 A1* | 1/2011 | van der Linden | H04L 67/1097 711/163 |
| 2011/0030061 A1* | 2/2011 | Artzi | G06F 11/3604 726/25 |
| 2011/0031015 A1* | 2/2011 | Downton | H04L 67/025 175/27 |
| 2011/0099500 A1* | 4/2011 | Smith | H04L 41/22 715/771 |
| 2011/0221592 A1* | 9/2011 | Maziak | G06F 11/0748 340/540 |
| 2013/0067024 A1* | 3/2013 | Vasters | G06F 9/542 709/217 |
| 2014/0379814 A1* | 12/2014 | Graff | H04M 1/72547 709/206 |
| 2015/0095216 A1* | 4/2015 | Van Heerden | G06Q 40/02 705/39 |
| 2016/0132934 A1* | 5/2016 | Hartlaub | G06Q 30/0269 705/14.64 |
| 2016/0378615 A1* | 12/2016 | Cohen | G06F 11/3055 714/19 |
| 2016/0380807 A1* | 12/2016 | Shevenell | H04L 41/0816 370/252 |
| 2016/0380831 A1* | 12/2016 | Shevenell | H04L 41/0816 370/254 |
| 2017/0068595 A1 | 3/2017 | Nautiyal et al. | |
| 2017/0192839 A1* | 7/2017 | Kurian | G06F 11/0772 |
| 2018/0192471 A1* | 7/2018 | Li | H04W 12/06 |
| 2018/0219723 A1* | 8/2018 | Scarpelli | H04L 41/069 |
| 2018/0253672 A1* | 9/2018 | Kosovan | G06Q 10/06313 |
| 2018/0309634 A1* | 10/2018 | Makovsky | H04L 41/145 |

OTHER PUBLICATIONS

Hybrid Integration Platform for Cloud, SaaS & IoT;[retrieved May 8, 2017] https://www.robomq.io/.
IBM Alert Notification; Sudhakar Chellam IBM, Senior Software Engineer;[retrieved May 5, 2017] https://www.ibm.com/devops/method/content/manage/tool_alert_notification/.
MuleSoft Documentation; GitHub, 2017 https://docs.mulesoft.com/;[retrieved May 9, 2017.].
Custom Application Alerts and Notifications; GitHub, 2017[retrieved May 9, 2017] https://docs.mulesoft.com/runtime-manager/custom-application-alerts.
Notifications on Runtime Manager; GitHub, 2017;[retrieved May 9, 2017.] https://docs.mulesoft.com/runtime-manager/notifications-on-runtime-manager.
How to monitor messages across SAP on-premise and SAP cloud for customer via Integration; 2016 http://www.mir3.com/products/intelligent-notification/.
Intelligent Notification Software http://www.mir3.com/products/intelligent-notification/ [retrieved May 9, 2017].

* cited by examiner

Hourly Notification:

ORACLE®

Tracking Metrics Hourly Report – ics1774 — 710

Reporting period: 2016-08-19 22:00 – 2016-08-19 23:00

| 4 — 720 | 4 — 730 | 0 — 740 | 4 — 750 | 0.0% — 760 |
|---|---|---|---|---|
| Total Messages Received | Total Messages Processed | Success | Failures | Success Rate |

To stop receiving email notifications from Integration Cloud Service, adjust your notifications settings.

Copyright ©2016, Oracle and/or its affiliates.
All rights reserved.

Contact Us | Legal Notices and Terms of Use | Privacy Statement

Daily Notification:

ORACLE

Tracking Metrics Daily Report – Ics1774 — 810

Reporting period: 2016-08-19 00:00 – 2016-08-20 00:00

| 200 | 190 | 149 | 41 | 78.4% |
|---|---|---|---|---|
| Total Messages Received | Total Messages Processed | Success | Failures | Success Rate |
| 820 | 830 | 840 | 850 | 860 |

To stop receiving email notifications from Integration Cloud Service, adjust your notifications settings.

Copyright ©2016. Oracle and/or its affiliates.
All rights reserved.

Contact Us | Legal Notices and Terms of Use | Privacy Statement

System Failure Notification:

ORACLE®

Service failures report – domain_ics — 1010

Reporting date: 2016-08-15 18:35 BST

| OK — 1020 | OK — 1030 | X — 1040 | OK — 1050 | OK — 1060 |
| Runtime Server | Storage Service | Messaging Service | Runtime Service | Runtime Security |

To stop receiving email notifications from Integration Cloud Service, adjust your notifications settings.

Copyright ©2016. Oracle and/or its affiliates.
All rights reserved.

Contact Us | Legal Notices and Terms of Use | Privacy Statement

CLOUD SERVICE NOTIFICATIONS

CROSS-REFERENCES TO RELATED APPLICATIONS

This application claims priority to India Patent Application No. 201641031590 filed on Sep. 16, 2016 in the India Patent Office, entitled "CLOUD SERVICE NOTIFICATIONS," and U.S. Provisional Patent Application No. 62/510,979 filed on May 25, 2017 in the United States Patent and Trademark Office, entitled "INTEGRATION CLOUD SERVICE," the disclosures of which are incorporated by reference herein in their entirety.

BACKGROUND

Example embodiments are related to the field of application integration and more specifically to methods, devices, systems and computer readable media for collecting and providing historical data for an integration flow.

Example embodiments are also directed to methods, devices, systems and computer readable media for providing notifications for an integration flow.

Applications may be integrated. Data or functions from a first application may be combined with data or functions of a second application. For example, the user of a marketing application may desire to use information from a human resources application. In another example, a new sales application may want to incorporate data from an old sales application. Instead of transferring or copying all of the data from the first application to the second application, the applications can be integrated. This would allow the second application to access and use data or functions from the first application more easily.

However, after applications are initially integrated, it is difficult to monitor a status of the integration. For example, a user may want to determine whether their integration is operating correctly. A user cannot easily determine the status of an integration.

Also, aspects of the integration may be causing errors and affecting the results of the integration. If changes are made to the first application, the changes can affect how data is received by the second application. For example, if a format of a record in the first application is changed and the second application is configured to receive the record in the first format, this may result in errors to the integration. However, it may be difficult to identify such errors and the source of the errors. Further, a long period of time may pass before a user becomes aware of any problems to the integration. By the time the user is aware of the integration problems, the problem may have progressed so that it will be very difficult to fix or a number of records to fix has increased. Also, once the user becomes aware of the problem, it can take the user additional time to identify the source and reason for the problem. Identifying the problem and addressing the problem can be a time consuming and laborious process.

BRIEF SUMMARY

Applications may be integrated or combined so that, for example, data between applications can be shared. Different types of applications, including on-premise and cloud applications, may be integrated by an integration system such as integration cloud service system. The applications may be in a cloud environment or may be on-premise at a location of the application provider. By integrating a plurality of different applications, a user can perform desired functions more quickly and efficiently.

In order to integrate data from a first application to a second application, an integration flow can be created. An integration flow can also be called an integration, a flow, or an orchestration. In order to integrate applications, an integration flow can be created that specifies how data in the first application is to be integrated or combined with the second application so that the data can be used by the second application. Applications that are integrated can include human resources applications, accounting applications, social media applications, etc. Any type of application that a user desires to combined can be integrated in an integration flow.

An integration flow can be created which identifies one or more sources of data, one or more targets for data, and actions to be performed on the data. An integration flow allows an integration to be configured such that a source payload can be inspected and decisions can be made as to whether the payload should be delivered to the configured target or if data should be sent conditionally to a different configured target. Specifically, an integration flow can include one or more source applications, one or more actions and one or more target applications. A source application, target application, and actions can be called activities. A source application and a target application are application activities and actions are action activities. Each of the activities can be represented as nodes or elements in an integration flow.

The source application can also be known as the trigger, trigger application, source activity, or trigger activity. The target application of the data can also be known as the destination application, invoke, invoke application, target activity or invoke activity. The actions can identify, for example, actions that are to be applied to particular data from the source application so that the data can be integrated with the target application. Through an integration flow, data from a first application can be made to be compatible with a second application. Therefore, the second application can use data from the first application.

An integration system, in accordance with example embodiments, simplifies the creation of an integration flow. A user with minimal technical knowledge can build up a very complex integration flow in order to integrate applications.

An integration cloud service system can include bilateral connections with one or more applications. The applications can offer different services. For example, the integration system can connect two or more applications. The applications can correspond to different types of systems. One or more applications could be stored on a cloud system and one or more applications can be stored in an on-premise system. An on-premise system can be located locally in, for example, a building. Therefore, a bilateral connection connects one endpoint, such as a source application, to a second endpoint, such as a target application.

The source application and the destination application can correspond to a same type of system or to a different type of system. For example, a business system application can be integrated with a resource planning system application, an FTP server can be connected with a data file representing different records, or different social media application systems can be connected. Given the vast number of applications that can be connected, the integration system can be very complex.

An integration system in accordance with some example embodiments can easily process changes to the system and identify any problems with the changes made to an integration flow. Whenever there is a change to an element or node of the integration flow, for example, if a parameter of a source application is changed (e.g., a change to an employee employment status), a message can be generated regarding the change. The message can be generated in response to a request to make the change. An integration system can process thousands of messages per second.

In accordance with an example embodiment, data regarding the integration flow can be collected. Further, in accordance with an example embodiment, the data that is collected can be visualized in historical form so as to help a user identify problems with the integration flow. Therefore, a user can easily visually identify an operation status of an integration flow and can easily visually identify the source of any problems to the integration flow.

In accordance with another example embodiment, data regarding any problems to the integration flow can be detected and a notification can be provided to the user. The notification can be provided to the user via, for example, an e-mail communication, a visual communication, a text message, etc. The notification can be provided to all of the users of the integration will or to a customized set of users of the integration flow. Therefore, a user can easily be made aware of the status of an integration and whether or not there are any problems with their integration.

The foregoing, together with other features and embodiments will become more apparent upon referring to the following specification, claims, and accompanying drawings.

BRIEF DESCRIPTION OF THE DRAWINGS

The disclosure will be readily understood by the following detailed description in conjunction with the accompanying drawings, wherein like reference numerals designate like elements, and in which:

FIG. 7 illustrates an example integration hourly notification, in accordance with some example embodiments.

FIG. 8 illustrates an example integration daily notification, in accordance with some example embodiments.

FIG. 10 illustrates an example system failure notification, in accordance with some example embodiments.

DETAILED DESCRIPTION

In the following description, for the purposes of explanation, specific details are set forth in order to provide a thorough understanding of example embodiments. However, it will be apparent that various embodiments may be practiced without these specific details. For example, systems, algorithms, structures, techniques, networks, processes, and other components may be shown as components in block diagram form in order not to obscure the embodiments in unnecessary detail. The figures and description are not intended to be restrictive.

A user can create an integration flow through an integration system. The user can include, for example, a creator of the integration flow, such as an integration developer. The user can also include, for example, an end user, such as a customer who desires to use the data provided by the integration flow.

I. Integration System

Figure 1:
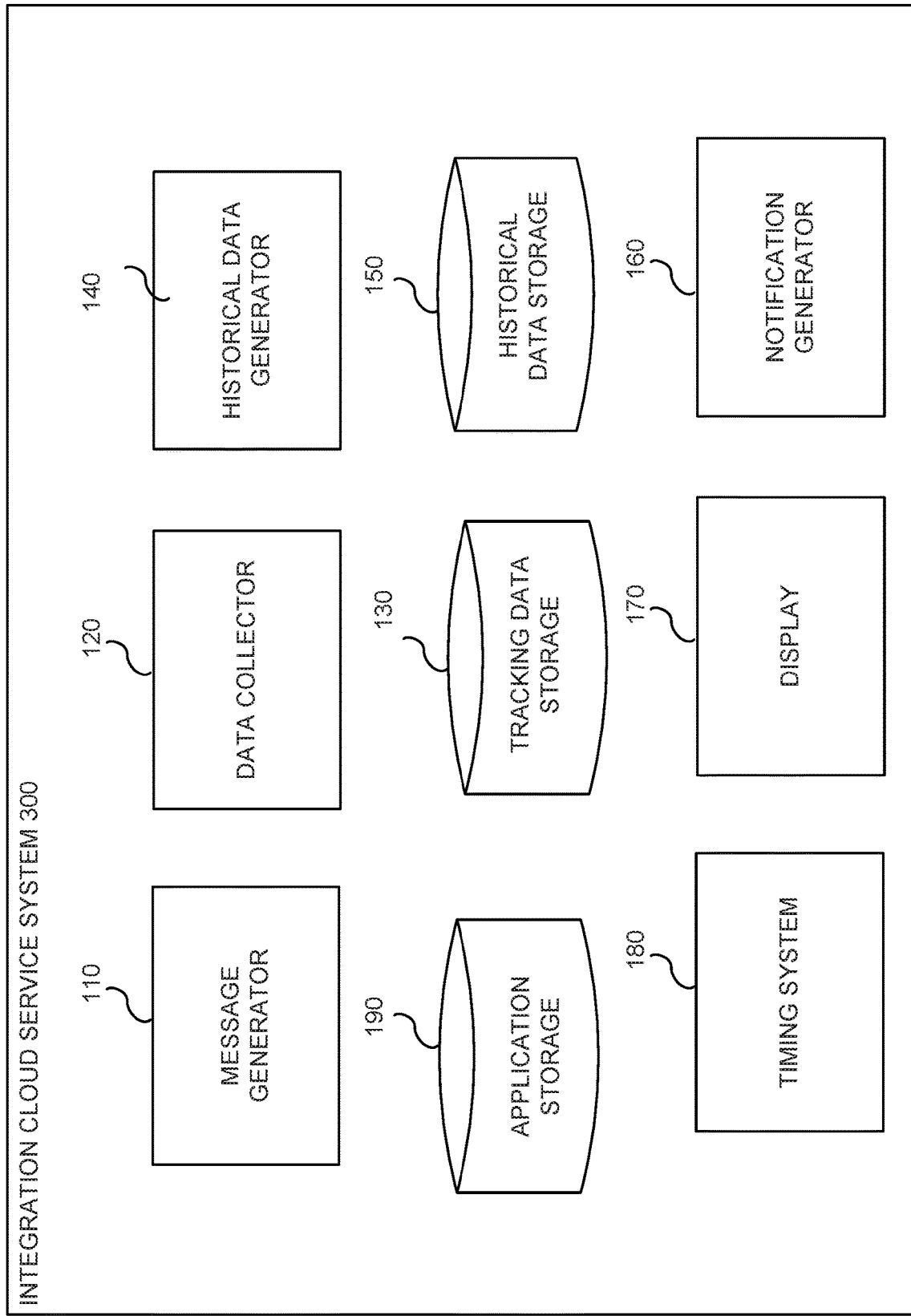
FIG. 1 illustrates an integration cloud service system, in accordance with some example embodiments.

An integration system can also be called an integration cloud service system. FIG. 1 illustrates an integration cloud service system 100, in accordance with some example embodiments. Through the integration cloud service system, the user can connect two or more applications together by creating an integration flow.

An integration in an integration cloud service system can be defined by a number of artifacts including a flow definition and supporting artifacts, such as Web Services Description Language (WSDLs), J2EE Connector Architecture (JCA) files and XML Schema Definitions (XSDs). These artifacts form an integration cloud service project which can be a base unit in terms of development, implementation, activation and import/export.

An integration flow can specify the applications that participate in the integration and the orchestration (flow) between them. An integration flow can be one artifact that is contained within the project. In an embodiment, an integration cloud service project can include at most a single integration flow. In alternative embodiments, an integration cloud service project can include a plurality of integration flows that together compose a single integration.

An integration flow can include a source application and a target application, as well as activities that are applied to connect the source application to the target application. The source application, target application and one or more actions can be called nodes or elements of the integration flow. Further, the source application and target application can be application activities of the integration flow and the actions can be action activities of the integration flow. When the integration flow is valid and applied, data from the source application can be compatible with the destination application.

Action activities can include, for example, assign, callback, fault return, for each, function call, logger, map, notification, raise error, return, scope, stage file, switch, stop, wait, and while. Action activities are actions that can be applied to data in an integration flow.

In an example integration flow, information from a human resources system can be connected with information in a marketing system. Employee information from the human resources system can be used by the marketing system in order to send marketing information to the employees. The human resources system can be the source application and the marketing system can be the target application. Activities can be applied to information (e.g., records) from the human resources system so that the information from the human resources system is compatible with the marketing system.

Through a integration cloud service system 100, a user can collect data regarding activities that are happening in the integration flow and can provide information to a user regarding the status of the integration flow.

For example, the user may change employee information in a source application that can affect the target application. Therefore, an example embodiment monitors changes to one or more nodes (e.g., source application, target application, activity) in an integration flow in order to provide data about the integration flow to a user.

The integration cloud service system 100 can include a message generator 110, a data collector 120, tracking data storage 130, a historical data generator 140, a historical data storage 150, a historical data storage 180, a display 170, a timing system 180, a notification generator 190, and applications 190.

Message generator 110 can generate a message that is processed by the integration cloud service system 100. A message can be generated in response to one or more requests made by a user to the integration flow. A request can include changes, additions, deletions or any other modifications to an integration flow. When the user makes a request, a message is generated by the integration system. If, for example, a user makes a change to an attribute of a source application, this change will trigger the generation of a message and the message will contain information regarding the change to the integration flow. The message can contain, for example, a new value of the attribute. The message describes the attribute and contains the new value. Further, the message can include information regarding the origin of the message (e.g., source application, target application, action) and the type of change that is requested.

In an example integration flow, a source application can be a human resources application and a target application can be a marketing application. In an example request, a new employee record can be added in the human resources application. Since a change has been made to the integration flow (e.g., to the source application), a message can be generated that indicates a change has been made to the source application.

The message will notify the integration cloud service system that a user requests to make a change. Since a change has been made in integration flow, the integration cloud service system will monitor the integration flow to ensure that the change will not cause any problems to the integration flow and that the integration flow is operating correctly. Therefore, the request, which can include a change, modification, deletion, addition, etc. to the integration flow, will trigger the generation of a message describing the request.

A data collector 120 will collect data regarding the change to the integration flow. For example, if a request is made to change input or output parameters of a node in the integration flow, then the data collector 120 will collect data regarding this change.

The data directed to the change can be stored in tracking data storage 130. The tracking data storage 130 can store the messages and store data related to the message. The data stored in the tracking data storage can be stored for a predetermined period of time or a predetermined retention period. For example, after data has been processed, the data can be removed from the tracking data storage 130 after three days. However, if the data has not been processed, then the data can remain in the tracking data storage 130 until a user removes it from the tracking data storage.

The historical data generator 140 will obtain the data that is stored in the tracking data storage 130 in order to generate historical data regarding the change in the integration flow. The historical data indicates the number of messages being processed and whether or not the messages are being processed successfully. The historical data generated by the historical data generator 140 can be stored in the historical data storage 150.

After a predefined or designated period of time has passed, a notification can be generated. The notification can be generated by the notification generator 160. The notification can inform the user regarding the status of the integration flow. The notification generator 160 can work in conjunction with a timing system 180. The timing system can include minute (e.g., 5 minute), hourly (e.g., 60 minutes), and daily timers (e.g., 24 hours). The timing system 180 can generate a notification based on parameters input by the user. For example, the user may input daily, hourly, or weekly notification parameters. The timing system 180 can communicate with the notification generator 160 to generate notifications in accordance with the notification parameters input by the user. The notification can be provided to the user via a user interface of the integration system, or the user can receive a notification communication (e.g., e-mail).

The notification that is generated can be provided to a user via a display 170. For example, the integration cloud service system can include a display 170 to display a monitoring dashboard. The monitoring dashboard can display information regarding an operation status of an integration flow. The display 170 can be any type of display device that can provide information to the user. Therefore, a user can be provided with historical data and notifications through the display 170. Further, the content of the notification can vary as configured by the user.

Application storage 190 can store information for a plurality of different applications. For example, application storage 190 can store data related to sales applications, marketing applications, human resources applications, etc. These are merely examples, and data for various kinds of applications can be stored in the application storage. Further, the data in the application storage 190 can vary according to the integration flow created by the user. The application data stored in the application storage 190 can correspond to source applications or target applications of the integration flow.

II. Historical Data Collection and Visualization

Figure 2:
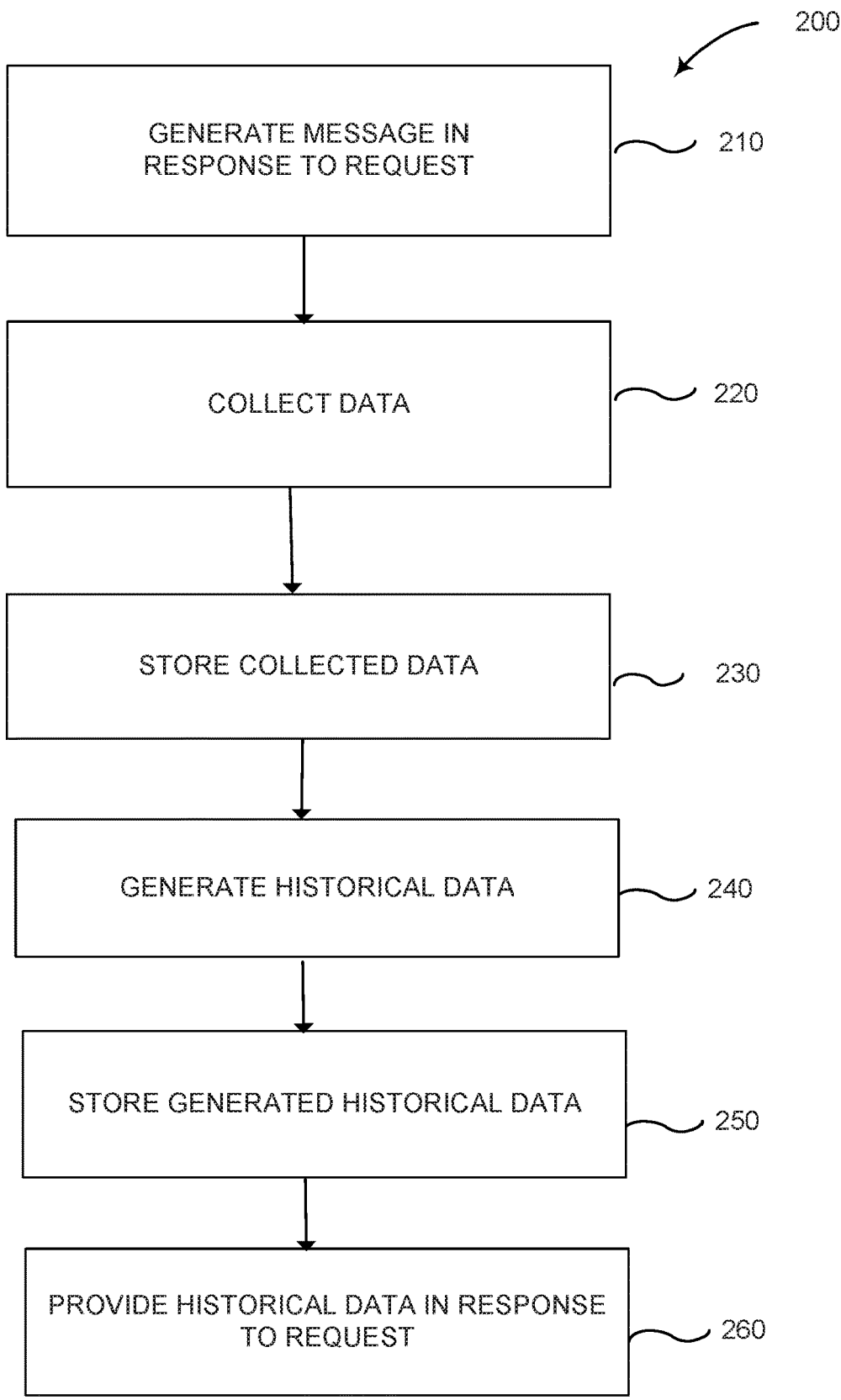
FIG. 2 illustrates a flow chart of a method for providing historical data, in accordance with some example embodiments.

FIG. 2 illustrates a flow chart of a method 200 for providing historical data, in accordance with some example embodiments. The steps of FIG. 2 can be performed by the integration cloud service system 100 as shown in FIG. 1.

If the user makes a change to an integration flow, the effects of the change can be monitored to ensure that the integration flow is operating correctly. Specifically, each of the nodes, which correspond to, for example, applications or actions, of the integration flow can be monitored to ensure that the integration flow is operating correctly.

For example, the user may change employee information in a source application that can affect the target application. Therefore, an example embodiment monitors changes to one or more nodes (e.g., source application, target application, action) in an integration flow in order to provide data about the change to a user.

If, for example, a change is made to the source application, the integration cloud service system will start to monitor the change and its effects on the integration flow. That is, the source application triggers a call to the integration cloud service system. In response to the call, the integration cloud service system can send a notification in response to the request. The source application can receive an answer as to whether the request was completed successfully, or if the request failed.

At step 210, a message is generated in response to a request. Generation of a message can be triggered in response to a request to make a change to the integration flow. The request may be making a change or modification to a node in an integration flow. A change to a node can include changing an input value or output value of the node. For example, every time there is a change to an employee status, a message can be generated indicating the change made by the user. The request can be initiated by an activity in the integration flow that is changed.

At step 220, data that is related to the request is collected. The data can be collected by the data collector 120. For example, if a user makes a change to a node, such as the source application, data regarding the change to the node can be collected. After a change to the integration flow has been made, data regarding the change to the integration flow can be collected. For example, the data can be obtained on an hourly basis or on a daily basis. The frequency of collecting the data can vary according to the types of data being collected were according to the type of applications in the integration flow.

At step 230, the data that is collected can be stored. The data that is collected can be stored in the tracking data storage 130. The tracking data storage can store data regarding a change to the integration flow for predetermined periods of time. For example, the tracking data storage can store statistical data from the time periods of 8:00 am to 9:00 am, or from 8/23 0:00 to 8/24 0:00.

In accordance with an example embodiment, resource usage of the integration cloud service system (e.g., provision of data) is kept to a minimum since data is collected and saved before generating historical data. The historical data does not to be generated every time there is a request. Instead, data is initially collected and saved. The data can be collected and saved in accordance with timers. Hourly data can be collected in accordance with hourly timers, and daily data can be collected in accordance with daily timers. The integration cloud service system may only call for data for missing periods of time (e.g. last hour). Therefore, data is available with as little delay as possible, and data provider calls are kept to minimum.

At step 240, historical data is generated based on the data that has been collected and stored. The historical data can be generated by the historical data generator 140 and stored in the historical data storage 150. Data that is stored in the historical data storage can be stored for a predetermined period of time, or as designated by user. Irrelevant and old data may be removed (e.g., routinely or at a scheduled time) and may not be retained so as to keep performance of the integration cloud service system stable and more efficient.

At step 260, the historical data can be provided to the user. The historical data can be provided via a notification or via a monitoring user interface of the integration cloud service system. The historical data can be provided to the user via the display 170. The historical data can also be sent to the user via, for example, a notification such as an email or text message or any other kind of electronic communication designated by the user. The notification can be generated by the notification generator 160.

The notification can indicate whether the request was completed successfully, or if the request failed. That is, the notification can indicate whether the message, that is generated in response to the request, has been processed successfully or unsuccessfully. If the message is processed successfully, it is identified as a successful message in the historical data visualization. If the message is not processed successfully, the message is identified as a failed message in the historical data visualization.

The method 200 of FIG. 2 can be performed after design time and when runtime of the integration flow is activated. In the example described in FIG. 2, the integration cloud service system communicates with, for example, the source applications that initiated the request. However, in accordance with other example embodiments, the integration cloud service system communicates with any of the nodes based on which node in the integration flow has changed.

Figure 3A:
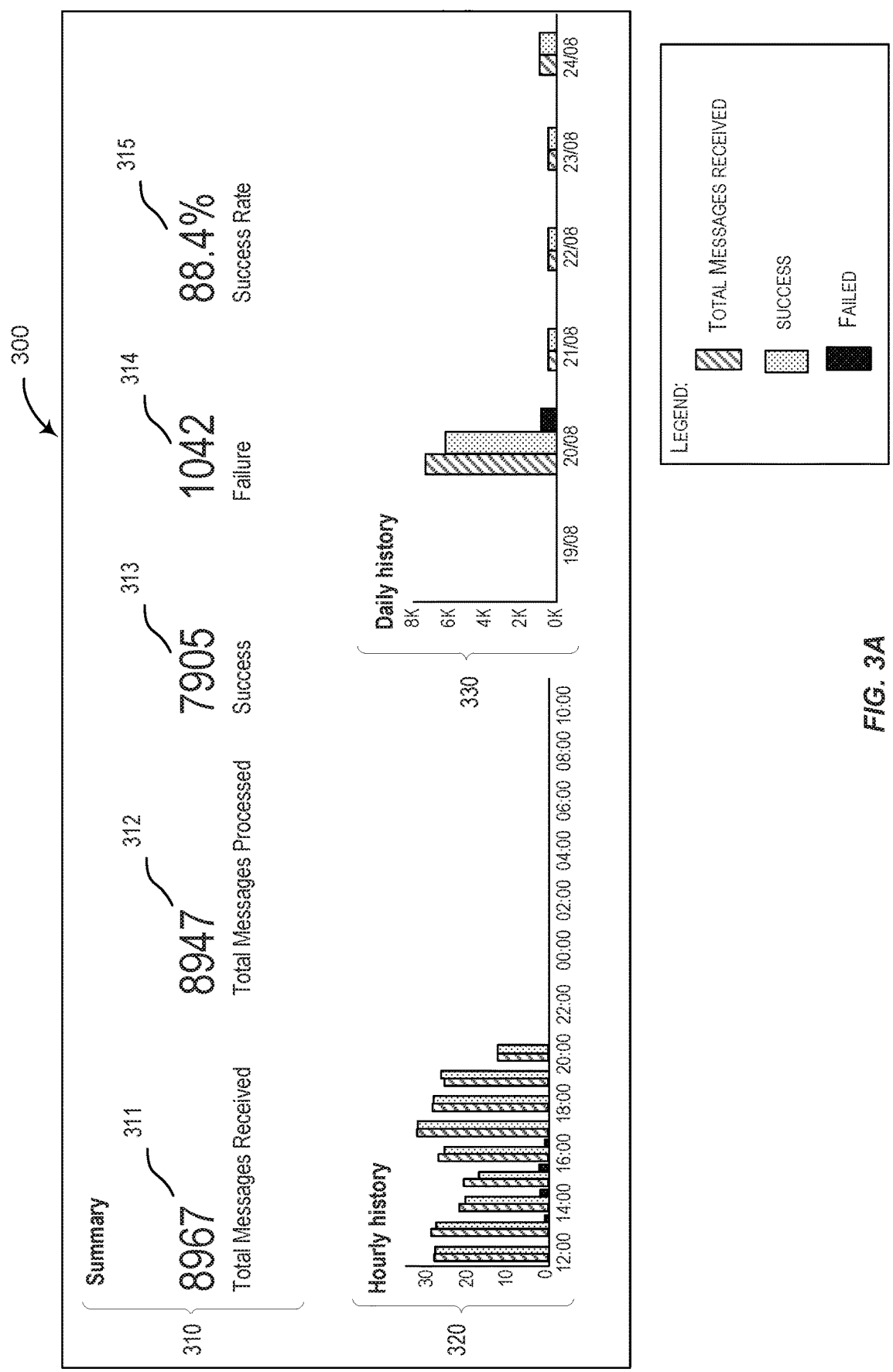
FIG. 3A illustrates historical data that is visible to a user, in accordance with some example embodiments.

FIG. 3A illustrates historical data 300 that is visible to a user, in accordance with some example embodiments. The historical data 300 can be obtained from the historical data storage 150 of FIG. 1. The historical data shown in FIG. 3A can be displayed on a user interface of the integration system, or the historical data can be provided to a user via a notification. A user of the integration cloud service system can use a monitoring user interface to monitor the integration flow. In response to the user selecting to monitor the integration flow, historical data 300, as shown in FIG. 3A and can be displayed to user.

The historical data 300 can include a summary 310, an hourly history 320, and a daily history 330. The summary 310 can include the total messages received 311, the total messages processed 312, successful messages 313, failed messages 314, and success rate 315.

The total messages received 311 are all of the messages that are received by the integration cloud service system. The messages are generated in response to any trigger made in the integration flow. For example, changes in the integration flow, such as addition or removal of information. The historical data is generated with respect to the change to ensure the integration flow is operating correctly.

The total messages processed 312 are all of the messages that are processed by the integration cloud service system at the time the historical data 300 is provided to the user. The messages can vary in the amount of time required to process the message. Some messages can be quickly processed while some messages may take a longer amount of time. For example, some messages can be processed in a few minutes whereas other messages may take half an hour (e.g., 30 minutes) or more. Therefore, the number of total messages processed 312 can be less than the total messages received 311.

Successful messages 313 indicates the number of messages that are processed successfully. For example, a change that has been made to the integration flow and is operating correctly, can be identified as successful message. A message is identified as successful if it has been processed through the integration flow.

Failed messages 314 indicates a number of messages that are not processed successfully or have an error.

Success rate 315 indicates the overall success rate of all of the messages that are received by the integration cloud service system. The success rate is based on the total messages received, the messages processed, and the failures.

The success rate can help a user determine whether there are problems with the integration flow. If for example, the success rate of the integration cloud service system is at 100% on day 1 and on day 2, the success rate of the integration cloud service system is at 90%, a user can determine what occurred between day 1 and day 2 to cause the decrease in the success rate. Therefore, a user can easily determine that there is a problem with the integration flow or that an aspect of the integration flow requires correction.

Hourly history 320 represents the hourly historical data in graphical form. The hourly history 320 displays information for the past hour. The x-axis represents the time (e.g., hourly) and the y-axis represents the number of messages. Daily history 330 represents the daily historical data in graphical form. The daily history 330 displays information for the past day or 24 hours. The x-axis represents the time (e.g., daily) and the y-axis represents the number of messages.

A user can increase or decrease (e.g., zoom) the viewing size of the historical data. Further, a user can select on any of the total messages received 311, the total messages processed 312, successful messages 313, and failed messages 314 to see the corresponding message. For example, if a user selects failed messages 314, then a listing of the messages that have failed can be provided to a user. Therefore, a user can easily identify which messages have been received, which messages have been processed, which messages have been processed successfully, and which messages result in a failure.

The number of messages processed can vary based on the applications that are triggering generation of the messages. In the hourly history 320 example shown in FIG. 3A, thirty (30) messages are shown. In the daily history 330, seven thousand (7 k) messages are processed. However, these are merely examples and some applications may trigger the generation of a few messages and some applications may trigger the generation of many more messages.

Further, messages are processed on a continuous basis while the integration flow is active (e.g., the integration flow is running). Therefore, depending on the time at which the notification is generated, the historical data shown in the notification or displayed to the user can vary.

After reviewing the historical data, if the user addresses the error or failure, the user can resubmit the message to determine whether the fix will address the error. Further, after fixing the error or failure, historical data can be regenerated and provided to the user.

Figure 3B:
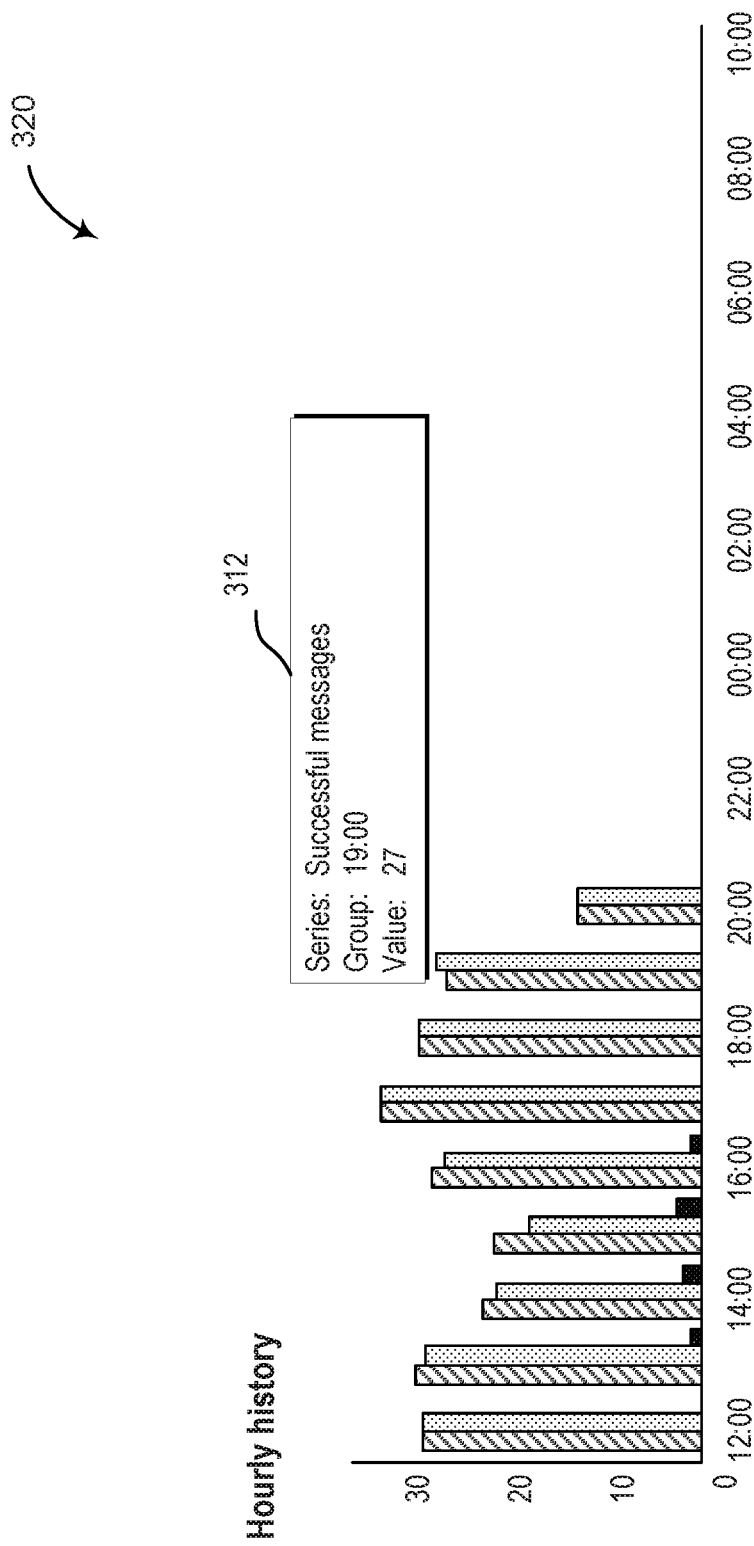
FIG. 3B illustrates the hourly history of FIG. 3A, in more detail, in accordance with some example embodiments.

FIG. 3B illustrates the hourly history 320 of FIG. 3A, in more detail, in accordance with some example embodiments.

As shown in FIG. 3B, the hourly history displays the total messages received, the messages that are processed successfully, and the messages that are not processed successfully. However, this is merely an example and historical data that is visually represented can be modified as configured by the user. The exact value of the bars, for example, the bars shown in the hourly history graph, can be provided in a pop-up window 312. Pop-up window 312 can appear in response to hovering over the bar. If the user hovers over a particular bar in the history information, the exact values of the bar can be made visible to the user. A user can hover a mouse over a bar in the historical representation. The values that are displayed can vary depending on the location where the cursor is hovered over the historical representation. The values displayed if a user hovers over the vertical bar on hour 12:00 can be different from the values that are displayed if a user hovers a cursor over the vertical bar over hour 16:00.

Historical data regarding messages processed by the integration system can be visually provided to a user. Therefore, a user can easily determine the status of an integration flow, and specifically the status of messages that are processed for the integration flow.

III. Notification Generation

Figure 4:
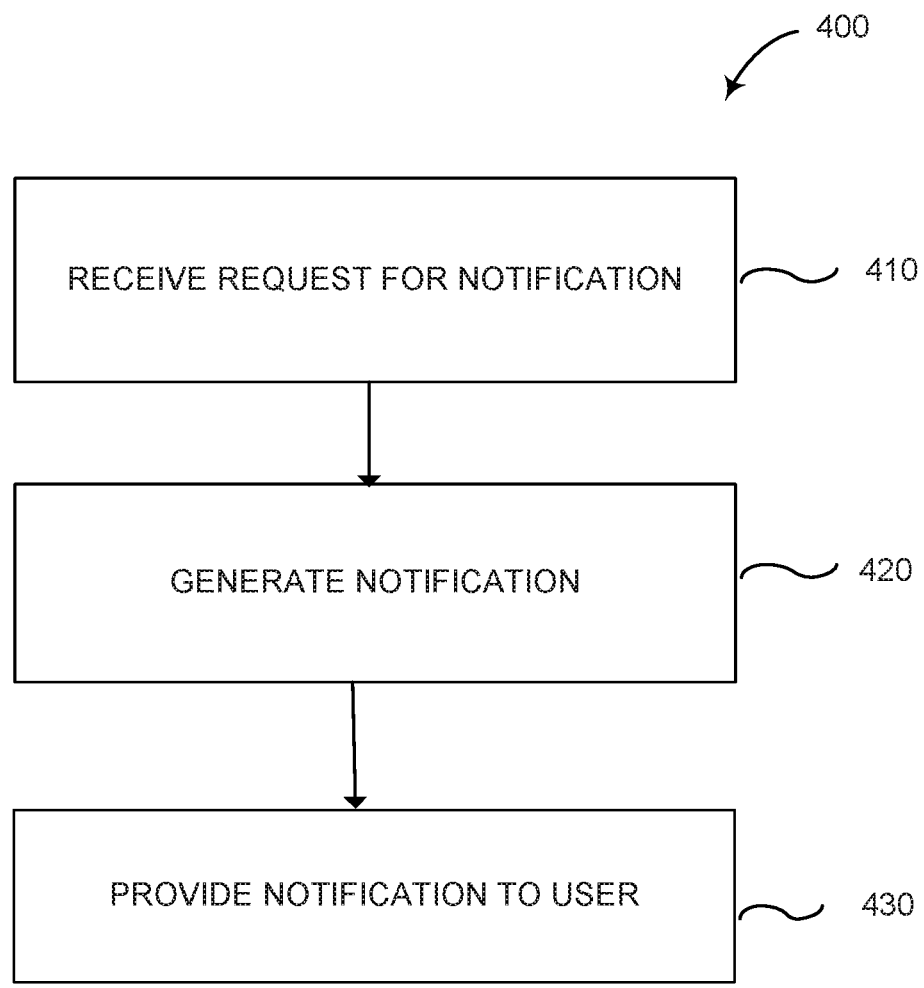
FIG. 4 illustrates a flowchart of a method for generating a notification, in accordance with some example embodiments.

FIG. 4 illustrates a flowchart of a method 400 for generating a notification, in accordance with some example embodiments. The method of FIG. 4 can be performed by the notification generator 160 shown in FIG. 1

At step 410, the integration cloud service system receives a request for a notification. The request for a notification can indicate whether the user would like to receive a status notification, failure notification or error notification. A user can subscribe to notifications. The notifications can also be called reports. A status notification can be sent on a routine basis. For example, a status notification can be sent on an hourly or daily basis, as selected by a user. A failure notification can be sent in response to a failure. For example, a failure notification can be sent in response to a system failure. An error notification can be sent in response to an error, such as an integration error. An integration error can include an error with the integration flow processing. An error notification can be sent in the event of an integration error.

At step 420, the integration cloud service system can generate one or more notifications in response to the request for the one or more notifications. Generation of the notification can vary based on whether status notifications, error notifications, or failure notifications are requested by the user. Step 420 will be described in more detail with respect to FIG. 6 and FIG. 9.

At step 430, the one or more notifications requested by the user are provided to the user. The notification can be sent to the user in the form of an e-mail, text message or any other communication method selected by the user. The status notifications are provided to the user based on the time periods selected by the user. The error and failure notifications can be provided to the user in the event of an error or failure, respectively.

Figure 5:
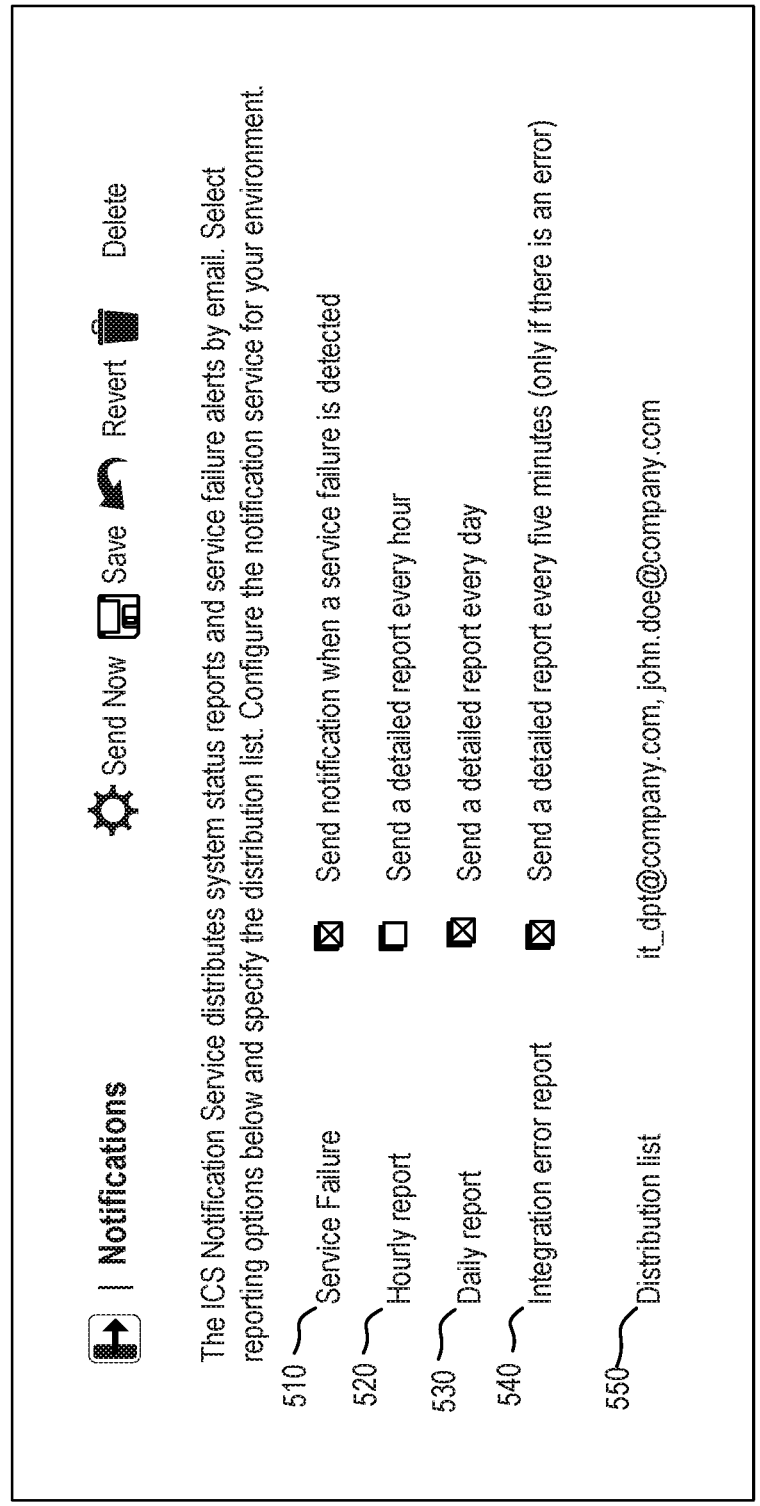
FIG. 5 illustrates an example notification configuration page for configuring a notification, in accordance with some example embodiments.

FIG. 5 illustrates an example notification configuration page 500 for configuring notifications, in accordance with some example embodiments. As shown in FIG. 5, a user can configure notifications that the user would like to receive. Through an interface for the integration cloud service system, a user can select desired notifications for their integration flows.

The type of notification and the recipients of the notification can be configured through the notification configuration page 500. Therefore, each user of the integration cloud service system can configure notifications based on their specific needs. Therefore, an example embodiment provides catered notifications in accordance with the users preferences.

As shown in FIG. 5, the notification configuration page 500 can be provided to the user so that the user can select desired notifications. The user can select to receive system failure reports 510, hourly reports 520, daily reports 530, and/or system error reports 540. A system failure report 510 can be generated in response to a service failure. An error report can be generated in response to an integration error of the integration flow. A user can select to receive one or more of the notifications, or a user can elect not to receive any notification. If the user selects to receive one or more of the notifications, the user can identify a distribution list 550 that indicates information for users who would like to receive the one or more notifications. Individual users can be identified or groups of users can be identified as customized by the user.

In generating a notification, the system balances between minimizing a number of calls to runtime critical layers, minimizing a delay between an occurrence of an error and the sending of the notification, and minimizing the number of notifications that is sent to the user in order to prevent flooding the user with notifications.

Figure 6:
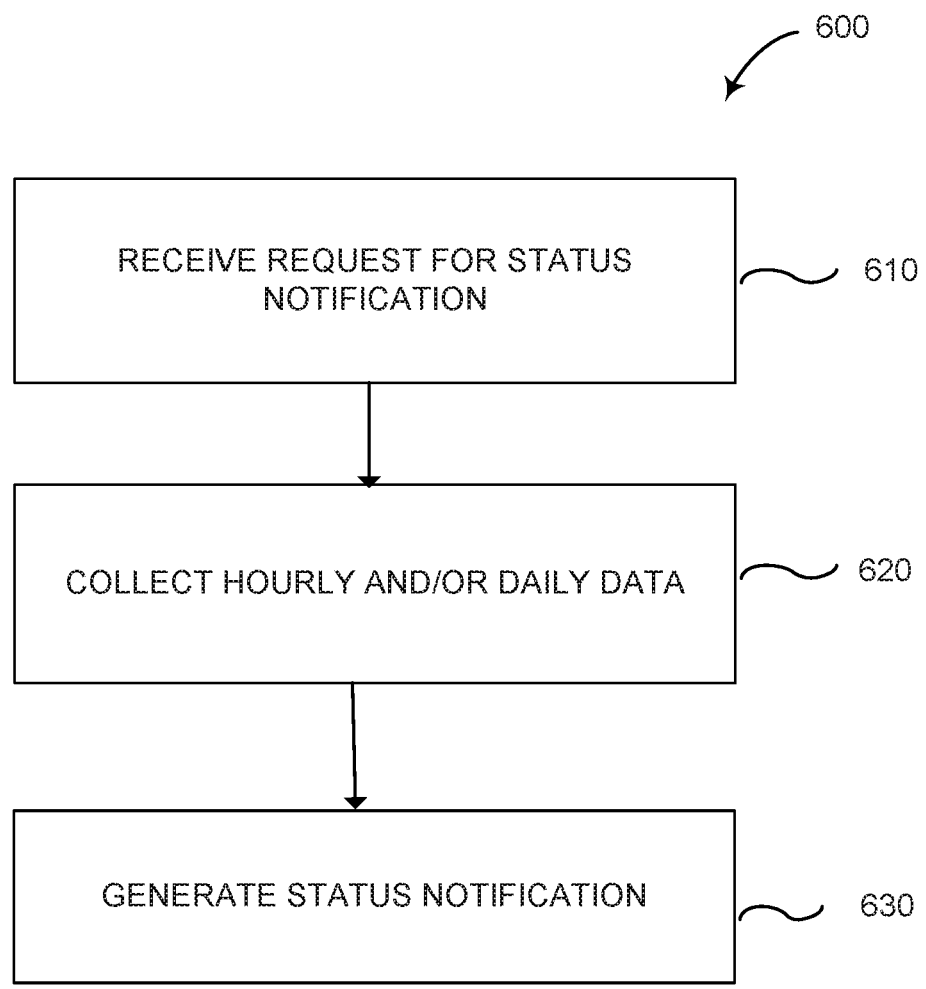
FIG. 6 illustrates a method of generating a status notification, in accordance with some example embodiments.

FIG. 6 illustrates a method 600 of generating a status notification, in accordance with some example embodiments. A status notification can be an hourly or daily notification, which provides the status of the integration at the time the notifications generated.

At step 610, the integration cloud service system receives a request for status notifications. The user may request hourly notifications, daily notifications or both hourly and daily notifications. For example, the user can select hourly reports 520 and/or daily reports 530 on the notification configuration page 500.

At step 620, based on the type of status notification requested by the user, data will be collected. Data can be collected on an hourly and/or daily basis depending on the type of status notification requested by the user. The notification generator can work in conjunction with the timing system. For example, based on a timing system status reports can be scheduled on an hourly and/or daily basis, similar to historical data collection.

FIG. 7 illustrates an example integration hourly notification 700, in accordance with some example embodiments. The hourly notification can also be called an hourly report. The hourly notification 700 includes a reporting period 710. The reporting period 710 identifies the period of time for which the notification is generated.

The hourly notification includes total messages received 720, total messages processed 730, successful messages 740, failed messages 750, and success rate 760. Total messages received 720 indicates the number of messages that are received during the reporting period 710. The total messages received 720 includes the total messages processed 730 for the given reporting period and messages that were not processed during the given reporting period (e.g., messages that will be reported in the next period). Total messages processed 730 indicates a number of messages that are processed during the reporting period 710. The total messages processed 730 includes messages that were processed successfully as well as messages that failed. Successful messages 740 indicates a number of messages that were processed successfully during the reporting period 710. Failed messages 750 indicates a number of messages that were not processed successfully during the reporting period 710. Messages that were not processed successfully can be messages that failed or messages that had an error. Success rate 760 is a value indicating a success rate for processing messages in the integration cloud service system. The success rate 760 can be calculated based on the number of successful messages processed 740 divided by the total messages processed 730 multiplied by 100 (e.g., success rate=successful messages/processed messages*100).

FIG. 8 illustrates an example integration daily notification 800, in accordance with some example embodiments. The daily notification can also be called a daily report. FIG. 8 includes information similar to FIG. 7, but the information in FIG. 8 is for a 24 hour time period since it is a daily notification.

The daily notification 800 includes a reporting period 810. The reporting period 810 identifies the period of time for which the notification is generated. The daily notification includes total messages received 820, total messages processed 830, successful messages 840, failed messages 850, and success rate 860.

Total messages received 820 indicates the number of messages that are received during the reporting period 810. The total messages received 820 includes the total messages processed 730 for the given reporting period and messages that were not processed during the given reporting period (e.g., messages that will be reported in the next period). Total messages processed 830 indicates a number of messages that are processed during the reporting period 810. The total messages processed 830 includes messages that were processed successfully as well as messages that failed. Successful messages 840 indicates a number of messages that were processed successfully during the reporting period 810.

Failed messages 850 indicates a number of messages that were not processed successfully during the reporting period 810. Messages that were not processed successfully will trigger an integration error report (i.e. when a user receives a notification email if an error occurred during processing any of his/her configured and activated integration). Failure at processing can be caused by variety of reasons. For example, the message may contain a property value which is unknown and/or out of value set for the target system. Success rate 860 is a value indicating a success rate for processing messages in the integration cloud service system. The success rate 860 can be calculated based on the number of successful messages processed 840 divided by the total messages processed 830 multiplied by 100 (e.g., success rate=successful messages/processed messages*100).

In addition to daily and/or hourly status notifications, a user can also request a notification in the event of an error and/or a failure occurring in an integration flow.

Figure 9:
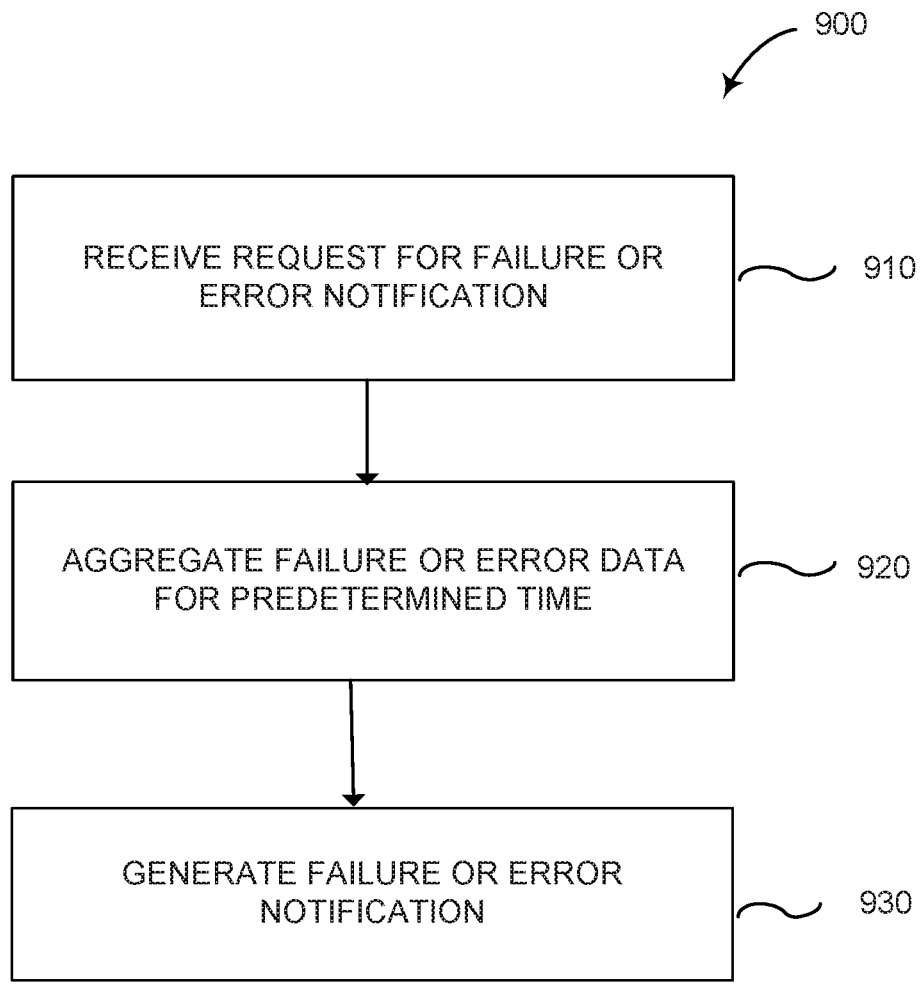
FIG. 9 illustrates flowchart of a method for generating a failure notification or error notification, in accordance with some example embodiments.

FIG. 9 illustrates a flowchart of a method 600 for generating a failure notification or error notification, in accordance with some example embodiments. A failure notification can be generated in the event of a system failure, and an error notification can be generated in the event of a system error.

At step 910, a request is received for a failure notification or an error notification. The requests can be received by for example, selecting error report 540 and/or failure report 510 on the configuration page shown on the notification configuration page 500.

At step 920, data is aggregated for the notification. If the user selects a failure or error notification, failures and/or errors are aggregated for a predetermined period of time (e.g. 5 minutes). After the predetermined amount of time has passed, the notification can be provided to the user. By aggregating failure or error notification data, a user will not be flooded with failure or error notifications since a notification does not need to be sent every time there is a failure or an error. Instead, failures and/or errors can be accumulated and sent to a user at a predetermined time, or based on the sensitivity of the failure and/or error. For example, failures and/or errors that require immediate attention can be sent more promptly after its occurrence then failures and/or errors that do not require immediate attention.

At step 930, the failure or error notification is generated and can be provided to a user. Notifications can be continuously provided to the user until the failure or error is resolved. Therefore, the type of error is taken into account in determining how frequently a notification should be provided to a user. The information can be collected after a predetermined amount of time (e.g., every five minutes) and it not collected continuously. Therefore, every 5 minutes, cached data is obtained to generate the error or failure notification. Since the information is not collected continuously, resources of the integration system are saved during runtime. The amount of time for generating the failure or error notification can be modified as desired by the user.

To achieve these goals the notification generator is built on top of timers, such as the timing system. A timer can be used to indicate when an error or failure notification should be sent to a user. If the conditions are problematic, then an email can be sent. Therefore, the providing of notifications is optimized so that a user receives the notification when needed. Further, the number of notifications provided to the user is controlled so that the user is not flooded with error notifications and failure notifications.

FIG. 10 illustrates an example system failure notification 1000, in accordance with some example embodiments. A system failure notification can be generated in the event of a system failure. A system failure can occur if the integration system stops operating.

The system failure notification 1000 includes a reporting date 1010, runtime server status 1020, storage service status 1030, messaging service status 1040, runtime service status 1050 and runtime security status 1060. The reporting date 1010 indicates date information for which the system failure notification is generated. Runtime server status 1020 indicates a status of the runtime server during the reporting date 1010. For example, runtime server status 1020 can include a status of a web logic server (WLS) (e.g., AdminServer, ManagedServer). Storage service status 1030 indicates a status of the storage service during the reporting date 1010. Storage service status 1030 can include a status of a consumed database space and/or a file system quota. Messaging service status 1040 indicates a status of the messaging service during the reporting date 1010. Messaging service status 1040 can indicate a status of a messaging cloud service. A messaging cloud service can act as a communication backbone to connect any internet-based application or device on cloud and on premise. Runtime service status 1050 indicates a status of the runtime service during the reporting date 1010. Runtime service status 1050 can include a status of, for example, a Service Bus Kernel, a Service Bus Framework Starter Application, etc. Runtime security status 1060 indicates a runtime security status of the integration cloud service system during the reporting date 1010. Runtime security status 1060 can include a status of a web services manager policy manager.

Figure 11:
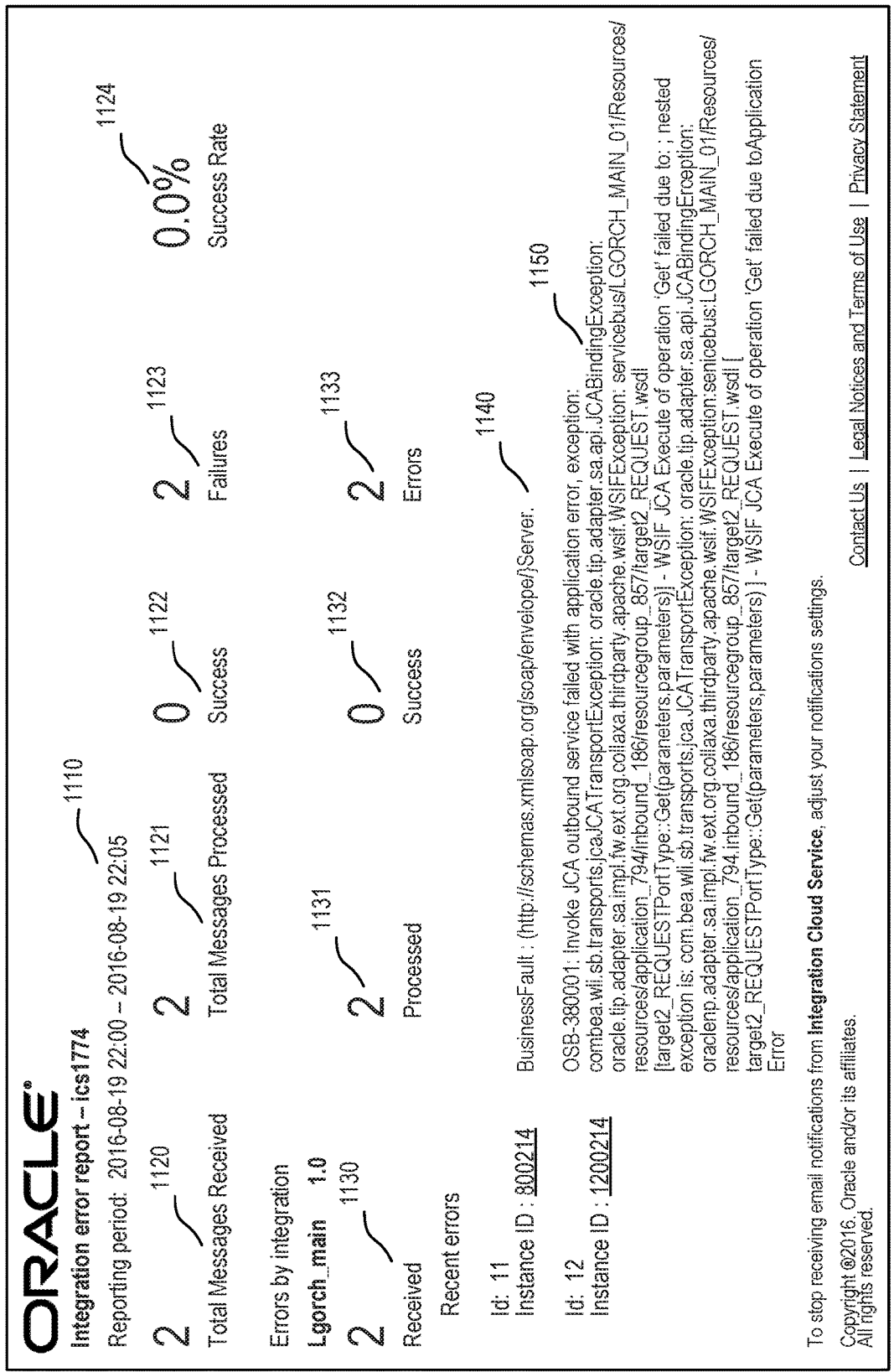
FIG. 11 illustrates an example system error notification, in accordance with some example embodiments.

FIG. 11 illustrates an example system error notification 1100, in accordance with some example embodiments. A system error notification can be generated in the event of a system error, such an integration error. For example, an invalid Organization ID in a payload sent by a source application to a target application can trigger an integration error.

The system error notification 1100 can include a reporting period 1110, a total messages received 1120, the total messages processed 1121, successful messages processed 1122, failure messages 1123, a success rate 1124, received errors 1130, processed errors 1131, successfully processed errors 1132, and existing errors 1133.

System error notifications can be provided in selected time increments (e.g., every five minutes). For example, at the end of a five minute time period, it is determined if there are any errors. If there are errors, then the errors are collected and a notification can be sent to a user. The notifications can be sent until there are no errors. However, this is merely an example and the frequency of providing notifications can vary according to the applications in an integration flow. Further, the error data is accumulated at the end of the selected time increment. For example, some applications may require a faster response time in the event of an error, and therefore, a notification will be generated more frequently. Some applications may allow for some time before an error requires correction, therefore, a notification can be provided less frequently.

As shown in FIG. 11, the system error notification 1100 can include a link 1140 and 1150 to the application so that a user can modify the notification settings. The notification 1100 can also contain a direct link 1140 and 1150 to the error. Therefore, if the user selects the link to the error, the user can quickly identify and resolve the problem since they will be directed to the error via the link.

The notifications described above are examples. The notifications can include more or less information than that shown in the figures and the figures are provided merely to provide examples.

IV. Computer System

Figure 12:
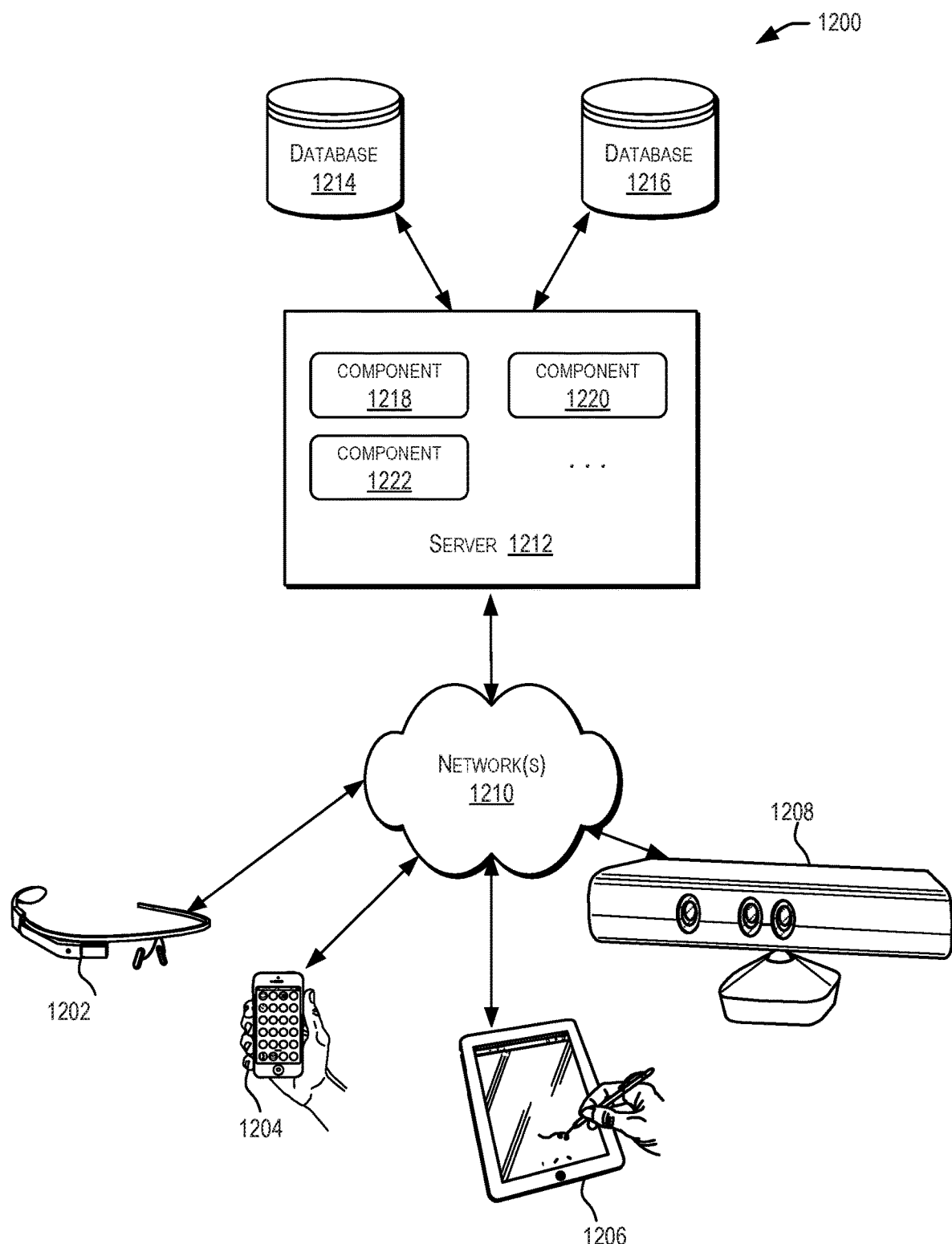
FIG. 12 illustrates a simplified diagram of a distributed system for implementing some example embodiments.
Figure 13:
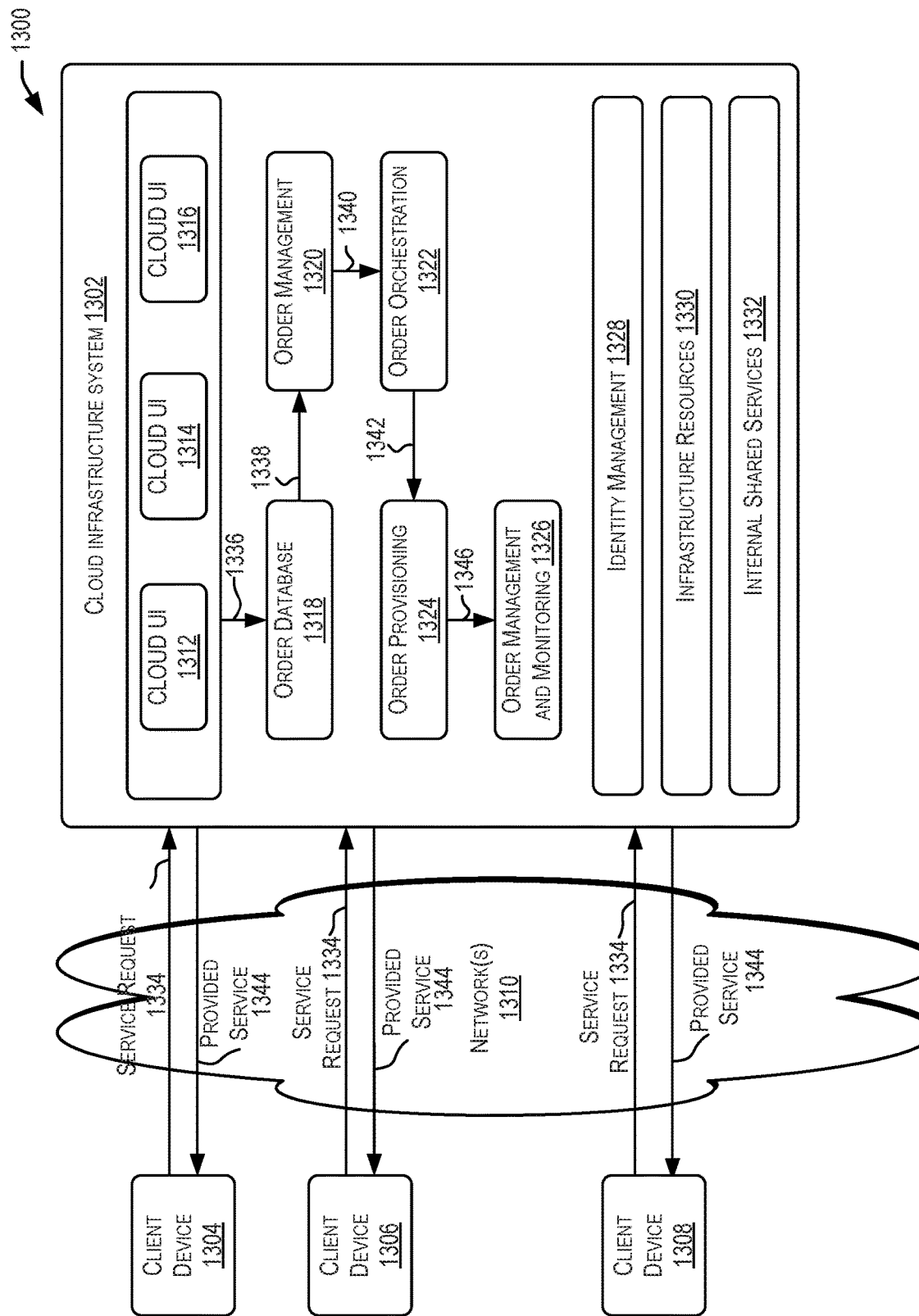
FIG. 13 illustrates a simplified block diagram of one or more components of a system environment in which services may be offered as cloud services, in accordance with some example embodiments.
Figure 14:
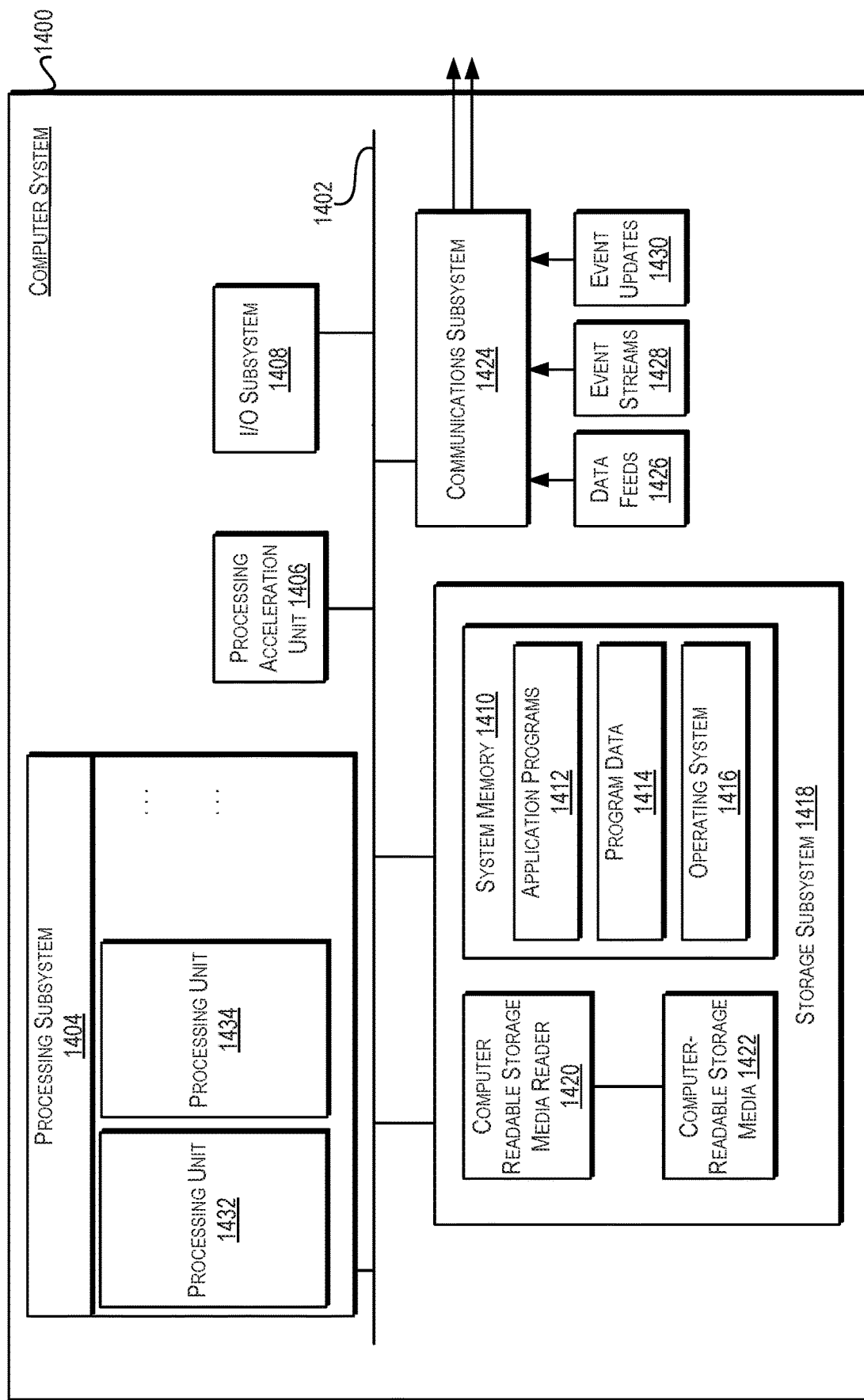
FIG. 14 illustrates an exemplary computer system that may be used to implement certain components according to some example embodiments.

FIGS. 12, 13, and 14 illustrate exemplary hardware and/or software configurations used in various embodiments.

FIG. 12 illustrates a simplified diagram of a distributed system for implementing some example embodiments. In the illustrated embodiment, distributed system 1200 includes one or more client computing devices 1202, 1204, 1206, and 1208, which are configured to execute and operate a client application such as a web browser, proprietary client (e.g., Oracle Forms), or the like over one or more network(s) 1210. Server 1212 may be communicatively coupled with remote client computing devices 1202, 1204, 1206, and 1208 via network 1210.

In various embodiments, server 1212 may be adapted to run one or more services or software applications such as services and applications that provide code and/or data for performing efficient application configuration patching for applications executing at the server 1212 or another server. In certain embodiments, server 1212 may also provide other services or software applications that can include non-virtual and virtual environments. In some embodiments, these services may be offered as web-based or cloud services or under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in FIG. 12, software components 1218, 1220 and 1222 of system 1200 are shown as being implemented on server 1212. As one example, one or more of the components (e.g., software component 1218) may be the configuration patch module or binary patch module discussed throughout the application.

In other embodiments, one or more of the components of system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in FIG. 12 is thus one example of a distributed system for implementing an embodiment system and is not intended to be limiting.

Client computing devices 1202, 1204, 1206, and/or 1208 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1210.

Although distributed system 1200 in FIG. 12 is shown with four client computing devices, any number of client computing devices may be supported. Other devices, such as devices with sensors, etc., may interact with server 1212.

Communication network(s) 1210 in distributed system 1200 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 120 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red (IR) network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1212 can include one or more virtual machines running virtual operating systems, or other computing architectures involving virtualization. One or more flexible pools of logical storage devices can be virtualized to maintain virtual storage devices for the server. Virtual networks can be controlled by server 1212 using software defined networking. In various embodiments, server 1212 may be adapted to run one or more services or software applications described in the foregoing disclosure.

Server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Distributed system 1200 may also include one or more databases 1214 and 1216. These databases may provide a mechanism for storing information such as user interactions information, usage patterns information, adaptation rules information, and other information used by some example embodiments. Databases 1214 and 1216 may reside in a variety of locations. By way of example, one or more of databases 1214 and 1216 may reside on a non-transitory storage medium local to (and/or resident in) server 1212. Alternatively, databases 1214 and 1216 may be remote from server 1212 and in communication with server 1212 via a network-based or dedicated connection. In one set of embodiments, databases 1214 and 1216 may reside in a storage-area network (SAN). Similarly, any necessary files for performing the functions attributed to server 1212 may be stored locally on server 1212 and/or remotely, as appropriate. In one set of embodiments, databases 1214 and 1216 may include relational databases, such as databases provided by Oracle, that are adapted to store, update, and retrieve data in response to SQL-formatted commands. However, databases 1214 and 1216 may provide relational databases, object-oriented databases, object-relational databases, NoSQL databases, etc., and may or may not be SQL-based. For example, databases 1214 and/or 1216 may be Oracle Database, PostgreSQL, Microsoft SQL Server, MySQL, MemSQL, Memcached, Redis, MongoDB, BigTable, Cassandra, DB2, Solr, etc.

In some embodiments, code and/or data for performing efficient application configuration patching may be offered as services via a cloud environment. FIG. 13 is a simplified block diagram of one or more components of a system environment 1300 in which services may be offered as cloud services, in accordance with some embodiments of the present disclosure. In the illustrated embodiment in FIG. 13, system environment 1300 includes one or more client computing devices 1304, 1306, and 1308 that may be used by users to interact with a cloud infrastructure system 1302 that provides cloud services. Additionally, in some embodiments the "client" computing devices 1304, 1306, 1308 may actually be server computers acting as a client in a client-server relationship, where the server may provide application configuration patching services. Cloud infrastructure system 1302 may comprise one or more computers and/or servers that may include those described above for server 1212.

It should be appreciated that cloud infrastructure system 1302 depicted in FIG. 13 may have other components than those depicted. Further, the embodiment shown in FIG. 13 is one example of a cloud infrastructure system that may incorporate some example embodiments. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 1202, 1204, 1206, and 1208. Client computing devices 1304, 1306, and 1308 may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302. Although exemplary system environment 1300 is shown with three client computing devices, any number of client computing devices may be supported. Other devices such as devices with sensors, etc. may interact with cloud infrastructure system 1302.

Communication network(s) 1210 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for communication network(s) 1210.

In certain embodiments, services provided by cloud infrastructure system 1302 may include a host of services that are made available to users of the cloud infrastructure system on demand. In addition to services related to providing code and/or data for performing efficient application configuration patching operations, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1302 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1302 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle Corporation) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1302 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1302 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database-as-a-Service (DaaS) in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform, and other resources.

In some embodiments, resources in cloud infrastructure system 1302 may be shared by multiple users and dynamically re-allocated per demand. Additionally, resources may be allocated to users in different time zones. For example, cloud infrastructure system 1302 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 to enable provisioning of services by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 1302, and the like.

In one embodiment, as depicted in FIG. 13, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In an exemplary operation, at 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI) such as cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

At 1336, the order information received from the customer may be stored in an order database 1318. If this is a new order, a new record may be created for the order. In one embodiment, order database 1318 can be one of several databases operated by cloud infrastructure system 1318 and operated in conjunction with other system elements.

At 1338, the order information may be forwarded to an order management module 1320 that may be configured to perform billing and accounting functions related to the order, such as verifying the order, and upon verification, booking the order.

At 1340, information regarding the order may be communicated to an order orchestration module 1322 that is configured to orchestrate the provisioning of services and resources for the order placed by the customer. In some instances, order orchestration module 1322 may use the services of order provisioning module 1324 for the provisioning. In certain embodiments, order orchestration module 1322 enables the management of business processes associated with each order and applies business logic to determine whether an order should proceed to provisioning.

As shown in the embodiment depicted in FIG. 13, at 1342, upon receiving an order for a new subscription, order orchestration module 1322 sends a request to order provisioning module 1324 to allocate resources and configure resources needed to fulfill the subscription order. Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. This enables order orchestration module 1322 to be isolated from implementation details, such as whether or not services and resources are actually provisioned on the fly or pre-provisioned and allocated/assigned upon request.

At 1344, once the services and resources are provisioned, a notification may be sent to the subscribing customers indicating that the requested service is now ready for use. In some instance, information (e.g. a link) may be sent to the customer that enables the customer to start using the requested services.

At 1346, a customer's subscription order may be managed and tracked by an order management and monitoring module 1326. In some instances, order management and monitoring module 1326 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1300 may include an identity management module 1328 that is configured to provide identity services, such as access management and authorization services in cloud infrastructure system 900. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

FIG. 14 illustrates an exemplary computer system 1400 that may be used to implement certain components according to some example embodiments. In some embodiments, computer system 1400 may be used to implement any of the various servers and computer systems described above. As shown in FIG. 14, computer system 1400 includes various subsystems including a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 may include tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1404 controls the operation of computer system 1400 and may comprise one or more processing units 1432, 1434, etc. A processing unit may include be one or more processors, including single core or multicore processors, one or more cores of processors, or combinations thereof. In some embodiments, processing subsystem 1404 can include one or more special purpose co-processors such as graphics processors (GPUs), digital signal processors (DSPs), or the like. In some embodiments, some or all of the processing units of processing subsystem 1404 can be implemented using customized circuits, such as application specific integrated circuits (ASICs), or field programmable gate arrays (FPGAs).

In some embodiments, the processing units in processing subsystem 1404 can execute instructions stored in system memory 1410 or on computer readable storage media 1422. In various embodiments, the processing units can execute a variety of programs or code instructions and can maintain multiple concurrently executing programs or processes. At any given time, some or all of the program code to be executed can be resident in system memory 1410 and/or on computer-readable storage media 1422 including potentially on one or more storage devices. Through suitable programming, processing subsystem 1404 can provide various functionalities described above for performing efficient application configuration patching operations.

In certain embodiments, a processing acceleration unit 1406 may be provided for performing customized processing or for off-loading some of the processing performed by processing subsystem 1404 so as to accelerate the overall processing performed by computer system 1400.

I/O subsystem 1408 may include devices and mechanisms for inputting information to computer system 1400 and/or for outputting information from or via computer system 1400. In general, use of the term "input device" is intended to include all possible types of devices and mechanisms for inputting information to computer system 1400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1418 provides a repository or data store for storing information that is used by computer system 1400. Storage subsystem 1418 provides a tangible non-transitory computer-readable storage medium for storing the basic programming and data constructs that provide the functionality of some embodiments. Software (programs, code modules, instructions) that when executed by processing subsystem 1404 provide the functionality described above may be stored in storage subsystem 1418. The software may be executed by one or more processing units of processing subsystem 1404. Storage subsystem 1418 may also provide a repository for storing data used in accordance with some example embodiments.

Storage subsystem 1418 may include one or more non-transitory memory devices, including volatile and non-volatile memory devices. As shown in FIG. 14, storage subsystem 1418 includes a system memory 1410 and a computer-readable storage media 1422. System memory 1410 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1400, such as during start-up, may typically be stored in the ROM. The RAM typically contains data and/or program modules that are presently being operated and executed by processing subsystem 1404. In some implementations, system memory 1410 may include multiple different types of memory, such as static random access memory (SRAM) or dynamic random access memory (DRAM).

By way of example, and not limitation, as depicted in FIG. 14, system memory 1410 may store application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1422 may store programming and data constructs that provide the functionality of some embodiments. Software (programs, code modules, instructions) that when executed by processing subsystem 1404 a processor provide the functionality described above may be stored in storage subsystem 1418. By way of example, computer-readable storage media 1422 may include non-volatile memory such as a hard disk drive, a magnetic disk drive, an optical disk drive such as a CD ROM, DVD, a Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1422 may provide storage of computer-readable instructions, data structures, program modules, and other data for computer system 1400.

In certain embodiments, storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for storing computer-readable information.

In certain embodiments, computer system 1400 may provide support for executing one or more virtual machines. Computer system 1400 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1400. Accordingly, multiple operating systems may potentially be run concurrently by computer system 1400. Each virtual machine generally runs independently of the other virtual machines.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to establish a communication channel to one or more client devices via the Internet for receiving and sending information from and to the client devices.

Communication subsystem 1424 may support both wired and/or wireless communication protocols. For example, in certain embodiments, communications subsystem 1424 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

Communication subsystem 1424 can receive and transmit data in various forms. For example, in some embodiments, communications subsystem 1424 may receive input communication in the form of structured and/or unstructured data feeds 1426, event streams 1428, event updates 1430, and the like. For example, communications subsystem 1424 may be configured to receive (or send) data feeds 1426 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1424 may be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1400 depicted in FIG. 14 is intended only as a specific example. Many other configurations having more or fewer components than the system depicted in FIG. 14 are possible. Based on the disclosure and teachings provided herein, a person of ordinary skill in the art will appreciate other ways and/or methods to implement the various embodiments.

Although specific example embodiments have been described, various modifications, alterations, alternative constructions, and equivalents are also encompassed within the scope of the example embodiments. The example embodiments are not restricted to operation within certain specific data processing environments, but are free to operate within a plurality of data processing environments. Additionally, although some example embodiments have been described using a particular series of transactions and steps, it should be apparent to those skilled in the art that the scope of the example embodiments is not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. Example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

What is claimed is:

1. A method of providing a notification by an integration cloud service system, the method comprising:
    identifying an integration flow, wherein the integration flow specifies a first application comprising first data and first functions to be integrated with a second application comprising second data and second functions,
    wherein the first application is integrated with the second application by combining the first data and first functions of the first application with the second data or second functions of the second application, wherein the first application is a source application and the second application is a target application,
    wherein the integration flow identifies at least one from a group consisting of a source of data, a target for data, and an action to be performed on data;
    receiving a notification configuration from a user, wherein the notification configuration comprises a type of notification that the user selects to receive regarding the integration flow;
    performing the integration flow;
    generating, while performing the integration flow, the type of notification selected in the notification configuration; and
    providing the type of notification selected in the notification configuration to the user.

2. The method according to claim 1, wherein the type of notification comprises one of a status notification for the integration flow, an error notification for the integration flow and a failure notification for the integration flow.

3. The method according to claim 2, wherein the status notification for the integration flow comprises one of an hourly status notification that is provided to the user every hour, and a daily status notification that is provided to the user every day.

4. The method according to claim 3, further comprising:
    in response to the type of notification being the hourly status notification obtaining hourly historical data at an end of hour; and
    generating the hourly status notification comprising the hourly historical data.

5. The method according to claim 3, further comprising:
    in response to the type of notification being the daily status notification obtaining daily historical data at an end of a day; and
    generating the daily status notification comprising the daily historical data.

6. The method according to claim 1, wherein the notification configuration comprises a distribution list identifying one or more users to receive the type of notification.

7. The method according to claim 2, in response to the type of notification being the status notification, generating the status notification comprising messages received information, messages processed information, successful messages information, failed messages information, and a success rate.

8. The method according to claim 2, further comprising:
in response to the type of notification being the error notification, determining a time point at an end of a time interval at which to provide the error notification to the user;
upon occurrence of the time point, identifying messages containing an error and that are generated during the time interval;
generating the error notification comprising the identified messages containing the error; and
providing the error notification to the user.

9. The method according to claim 2, in response to the type of notification being the error notification, generating the error notification comprising a link identifying a source of an error, wherein the link directs the user to the source of the error.

10. The method according to claim 1, wherein the notification is provided to the user via an electronic communication.

11. A non-transitory computer readable storage medium storing instructions which, when executed by one or more processors of a computing device, cause the one or more processors to perform a method comprising:
identifying an integration flow, wherein the integration flow specifies a first application comprising first data and first functions to be integrated with a second application comprising second data and second functions,
wherein the first application is integrated with the second application by combining the first data and first functions of the first application with the second data or second functions of the second application, wherein the first application is a source application and the second application is a target application,
wherein the integration flow identifies at least one from a group consisting of a source of data, a target for data, and an action to be performed on data;
receiving a notification configuration from a user, wherein the notification configuration comprises a type of notification that the user selects to receive regarding the integration flow;
performing the integration flow;
generating, while performing the integration flow, the type of notification selected in the notification configuration; and
providing the type of notification selected in the notification configuration to the user.

12. The non-transitory computer readable storage medium according to claim 11, wherein the type of notification comprises one of a status notification for the integration flow, an error notification for the integration flow and a failure notification for the integration flow.

13. The non-transitory computer readable storage medium according to claim 12, further comprising:
in response to the type of notification being the error notification, determining a time point at end of a time interval at which to provide the error notification to the user;
upon occurrence of the time point, identifying messages containing an error and that are generated during the time interval;
generating the error notification comprising the identified messages containing the error; and
providing the error notification to the user.

14. The non-transitory computer readable storage medium according to claim 12, in response to the type of notification being the error notification, generating the error notification comprising a link identifying a source of an error, wherein the link directs the user to the source of the error.

15. The non-transitory computer readable storage medium according to claim 11, wherein the notification is provided to the user via an electronic communication.

16. A computing device, comprising:
a memory; and
one or more processors configured to:
identify an integration flow, wherein the integration flow specifies a first application comprising first data and first functions to be integrated with a second application comprising second data and second functions,
wherein the first application is integrated with the second application by combining the first data and first functions of the first application with the second data or second functions of the second application, wherein the first application is a source application and the second application is a target application,
wherein the integration flow identifies at least one from a group consisting of a source of data, a target for data, and an action to be performed on data;
receive a notification configuration from a user, wherein the notification configuration comprises a type of notification that the user selects to receive for regarding the integration flow;
perform the integration flow;
generate, while performing the integration flow, the type of notification selected in the notification configuration; and
provide the type of notification selected in the notification configuration to the user.

17. The computing device according to claim 16, wherein the type of notification comprises one of a status notification for the integration flow, an error notification for the integration flow and a failure notification for the integration flow.

18. The computing device according to claim 17, further comprising:
in response to the type of notification being the error notification, determining a time point at an end of a time interval at which to provide the error notification to the user;
upon occurrence of the time point, identifying messages containing an error and that are generated during the time interval;
generating the error notification comprising the identified messages containing the error; and
providing the error notification to the user.

19. The computing device according to claim 17, in response to the type of notification being the error notification, generating the error notification comprising a link identifying a source of an error, wherein the link directs the user to the source of the error.

20. The computing device according to claim 16, wherein the notification is provided to the user via an electronic communication.

* * * * *

UNITED STATES PATENT AND TRADEMARK OFFICE
CERTIFICATE OF CORRECTION

Page 1 of 1

PATENT NO. : 10,929,202 B2
APPLICATION NO. : 15/705963
DATED : February 23, 2021
INVENTOR(S) : Gravenites et al.

It is certified that error appears in the above-identified patent and that said Letters Patent is hereby corrected as shown below:

In the Specification

In Column 9, Line 36, delete "(7 k)" and insert -- (7k) --, therefor.

In the Claims

In Column 28, Line 34, in Claim 16, delete "receive for" and insert -- receive --, therefor.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*